United States Patent Office 2,864,478
Patented Dec. 16, 1958

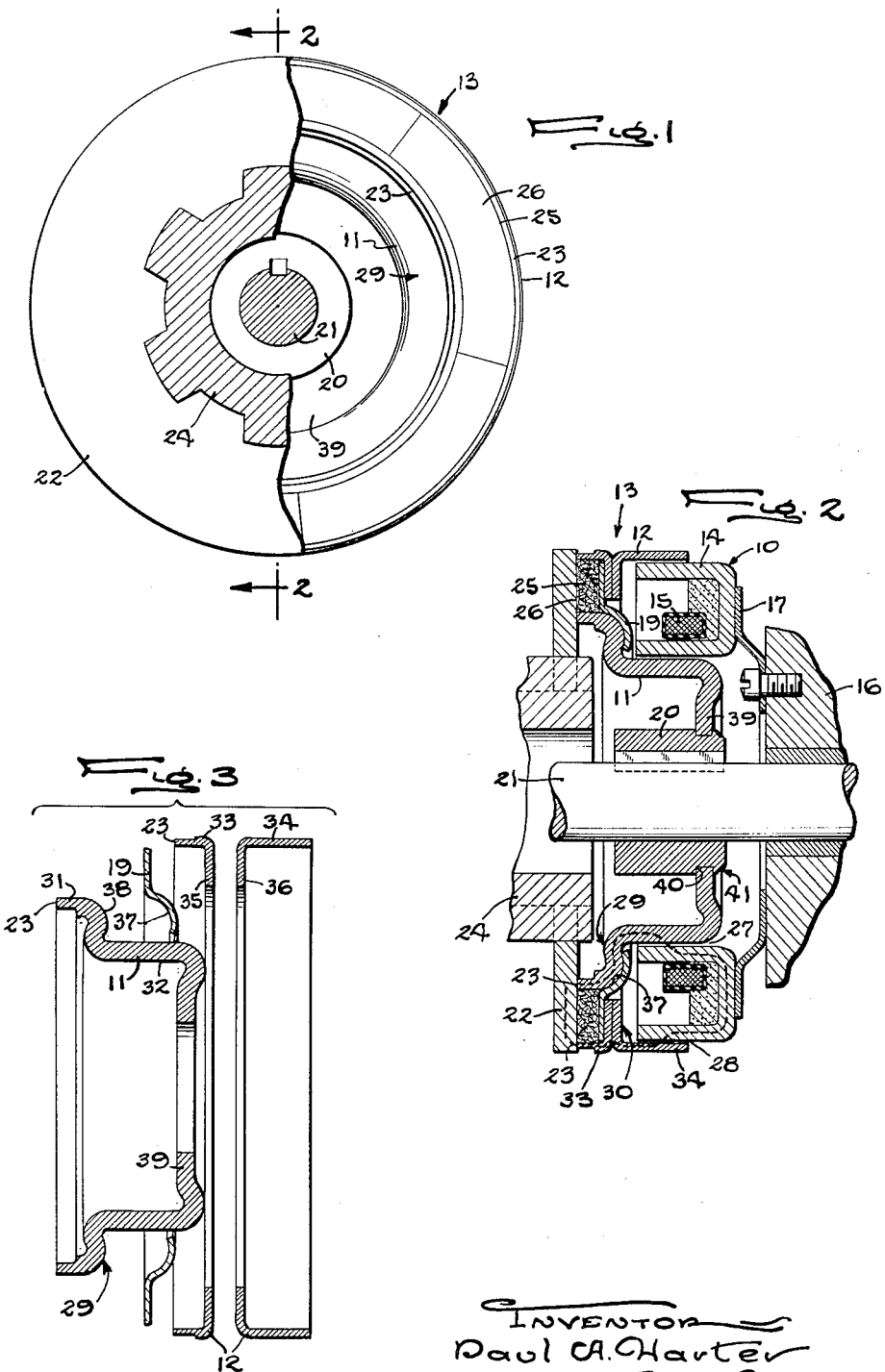

2,864,478

POLE PIECE UNIT FOR MAGNETS

Paul A. Harter and Robert C. Walter, Beloit, Wis., assignors to Warner Electric Brake & Clutch Company, South Beloit, Ill., a corporation of Illinois Application June 30, 1953, Serial No. 365,128

12 Claims. (Cl. 192—84)

This invention relates to magnets and more particularly to annular electromagnets, such as are used in electromagnetic friction clutches and brakes, in which the pole pieces are formed as a unit separate from the core of the magnet. The pole piece unit is composed of inner and outer concentric pole rings rigidly connected but magnetically separated by a spacer and telescoping with the core of the magnet.

The general object is to provide a new and improved pole piece unit which is simple and inexpensive to manufacture as compared to prior constructions.

A more detailed object is to construct and arrange the parts in a novel manner to permit the pole rings and the spacer to be made as sheet metal stampings which are adapted to be assembled and joined quickly and easily.

The invention also resides in the novel mounting of the pole piece unit when the latter is employed in a clutch.

Other objects and advantages of the invention will become apparent from the following detailed description taken in connection with the accompanying drawings, in which—

Figure 1 is an end view with parts shown in section and parts broken away and shows a clutch employing the novel pole piece unit of the present invention.

Fig. 2 is a fragmentary sectional view taken along the line 2—2 in Fig. 1.

Fig. 3 is an exploded longitudinal sectional view of the stamped parts of the pole piece unit.

For the purpose of illustration, the invention is shown embodied in an annular electromagnet 10 with inner and outer concentric pole rings 11 and 12 which are formed as a separate rigid unit 13 and telescope with the magnet core 14. The latter is a ring of U-shaped radial cross section with an energizing coil 15 wound within the U and is mounted on a stationary member 16 by means of a plate 17 welded to the back of the core and bolted to the member. A nonmagnetic spacer 19, which may be made of stainless steel, is joined to each of the pole piece rings and rigidly connects but magnetically separates the rings to form the pole piece unit 13.

Magnets of the foregoing type are used in electromagnetic friction clutches and brakes such as the clutch shown in Figs. 1 and 2. When the magnet is employed in a clutch, the pole piece unit 13 is mounted on one rotary member 20, herein a collar keyed to a shaft 21, to constitute one element of the clutch while the other element is a flat armature 22 bridging concentric pole faces 23 formed on the ends of the pole rings 11 and 12, the armature being splined to a hollow shaft 24. An annulus 25 of wear material, such as ordinary brake lining, is pressed in between the pole rings with its outer surface flush with the pole faces 23 so as to present a friction face 26 to the armature.

As shown in Fig. 2, the inner and outer pole rings 11 and 12 telescope respectively with the inner and outer legs of the U-shaped core 14 but are radially spaced slightly from the legs to define narrow annular gaps 27 and 28. Thus, when the coil 15 is energized, magnetic flux threads a substantially closed path from the core across the gap 27, through the pole ring 11, the armature 22 and the pole ring 12 and back to the core across the gap 28 as indicated by the broken line. Such flux draws the armature into gripping engagement with the friction face 26 of the pole piece unit 20 so that the two shafts 21 and 24 turn together.

In accordance with the present invention, the pole piece unit 13 is constructed in a novel manner to simplify the manufacture of the unit and reduce the overall cost. This is accomplished by shaping and arranging the parts, preferably both the pole rings 11 and 12 and the spacer 19, so that they may be stamped from sheet metal and then assembled and joined quickly and easily. To this end, the inner and outer pole rings are formed with radial flanges or parts 29 and 30 respectively which project toward each other and are overlapped by the spacer to permit the latter to be connected securely and inexpensively to the rings through these parts as by spot welding.

In the present instance, the radial part 29 on the inner pole ring 11 is provided by forming the ring in two radially offset cylindrical sections 31 and 32 with an intermediate portion extending radially between the cylindrical sections and constituting the part 29 to which the spacer 19 is attached. The pole face 23 on the inner ring is formed on the outer end of the section 31 while the longer section 32 telescopes with the inner leg of the magnet core 14. The pole ring is bent gradually between the outer cylindrical portion 31 and the intermediate portion 29 and also between the latter and the inner cylindrical portion 32 and thus is adapted to be stamped from a sheet metal ring.

To form the radial part 30 on the outer pole piece 12, the latter is made in two parts 33 and 34 which herein are axially alined rings with inturned flanges 35 and 36 at adjacent ends. The flanges, which constitute the part 30, project radially inwardly from and at right angles to their respective rings and abut against each other so that they may be spot welded together to join the rings 33 and 34. The latter generally correspond in length to the lengths of the cylindrical portions 31 and 32 of the inner pole piece 11 so that the ring 34 telescopes with the outer leg of the magnet core 14 while the pole face 23 is formed on the end of the ring 33.

In order to join the pole pieces 11 and 12 rigidly together while maintaining the two magnetically separated, the nonmagnetic spacer 19 is disposed between the pole pieces with a part lying alongside and secured to the radially projecting portion 30 on the outer pole piece and another part overlapping and fastened to the radial portion 29 on the inner pole piece. While the spacer may be composed of a plurality of segments angularly spaced around the pole piece unit 13, it is preferred to employ a ring with its outer peripheral portion disposed in front of the flange 35 on the outer pole piece ring 12 and its inner peripheral portion lying against the back of the intermediate portion 29 of the inner pole piece 11. The peripheral portions of the spacer ring are spot welded to the overlapped flange 35 and intermediate portion 29 respectively. If desired, the outer spacer ring portion may be spot welded to the flange 35 in the same operation in which the two flanges 35 and 36 are spot welded together.

Advantage is taken of the gradual bending of the inner pole piece 11 between the cylindrical and intermediate portions 31 and 29 to locate the spacer 19 and the inner pole piece properly with respect to each other so that the two pole pieces are concentric and telescope accurately with the legs of the magnet core 14 to give the air gaps 27 and 28 the desired width. This is achieved by curving the inner peripheral portion of the spacer to present a surface 37 complementing the curved surface 38 on the inner pole piece between the cylindrical and intermediate portions 31 and 29. Thus the proper concentric relation of the pole pieces is obtained simply by placing the surface 37 against the surface 38.

The ring 33 of the outer pole piece 12 and the cylindrical portion 31 of the inner pole piece 11 cooperate with each other and with the spacer ring 19 to define an annular recess for receiving the wear ring 25 which, in the present instance, is composed of a plurality of segments disposed end to end around the pole piece unit as shown in Fig. 1. The radial flanges 35 and 36 on the outer pole piece project in behind the wear ring and serve as a rigid backing for the latter. The outer surface of the wear material and the ends of the pole pieces are machined to form the friction face 26. The peripheries of the ring 33 and the cylindrical portion 31 also are machined so that the ends of the pole pieces have the proper cross sectional area to obtain the desired flux density.

Preferably, the pole piece unit 13 is mounted on the rotary sleeve 20 by a flange 39 projecting radially inwardly from the end of the cylindrical portion 32 of the inner pole piece 11 and secured to the sleeve. Herein, the flange 39 is formed in a novel manner to make the gap 27 long without adding to the overall length of the assembly. To this end, the inner pole piece is bent through an angle somewhat greater than 90 degrees between the cylindrical portion and the flange so that the latter is disposed within the cylindrical portion. This permits the use of a short sleeve 20 and, at the same time, the bending of the inner pole piece to form the flange 39 is gradual enough to be made by a simple stamping operation. To secure the inner pole piece to the sleeve, one side of the flange is seated against a shoulder 40 on the sleeve while the sleeve is pinched up around the other side of the flange as indicated at 41.

The pole piece unit 13 when constructed in the foregoing manner is comparatively simple and inexpensive to manufacture. The pole pieces 11 and 12 as well as the spacer 19 are readily adapted to be made as sheet metal stampings and are arranged to be joined easily by spot welding. Further accurate concentric mounting of the pole pieces is assured by the use of the complementary curved surfaces 37 and 38 on the spacer and the inner pole piece.

We claim as our invention:

1. An annular pole piece unit comprising two cylindrical rings of magnetic material disposed end to end and having inturned radial flanges at adjacent ends joined together to connect the rings and form an outer pole piece, an inner annular pole piece of magnetic material smaller than and concentric with said rings and having radially and axially offset cylindrical portions and an intermediate portion joining the adjacent ends of the cylindrical portions, axially facing pole faces respectively formed on the ends of one of said rings and the corresponding one of said cylindrical portions, and a nonmagnetic annulus disposed between said pole pieces and having an outer peripheral edge portion lying alongside and joined to one of said flanges and an inner peripheral edge portion lying against and fastened to said intermediate portion of said inner pole piece thereby to rigidly connect but magnetically separate the two pole pieces.

2. An annular pole piece unit comprising two rings of magnetic material disposed end to end and having inturned radial flanges at adjacent ends joined together to connect the rings and form an outer pole piece, an inner annular pole piece of magnetic material smaller than and concentric with said rings and having radially and axially offset cylindrical portions and an intermediate portion joining the adjacent ends of the cylindrical portions, axially facing pole faces formed on the corresponding ends of said pole pieces, and a nonmagnetic element extending generally radially between said pole pieces and having a part disposed alongside and fastened to one of said flanges and a part lying alongside and joined to said intermediate portion to rigidly connect but magnetically separate said pole pieces.

3. A magnet structure comprising a magnetic cylinder having an integral radial flange at one end and an axially facing pole face at the other end, a magnetic ring having a cylindrical end portion concentric with said cylinder and terminating at one end in a pole face facing axially and substantially flush with said first face, said ring having an intermediate portion turned radially inwardly at the end of said cylindrical portion opposite the pole face, a second magnetic cylinder having a radial flange at one end abutting against and secured to said first flange, and a nonmagnetic ring having one edge portion lying against and secured to one of said flanges and another edge portion lying against and secured to said intermediate portion of said magnetic ring.

4. An annular pole piece unit comprising two rings of magnetic material disposed end to end and having inturned radial flanges abutting against each other and connected together whereby said rings constitute an outer pole piece, an inner pole piece smaller than and concentric with said outer pole piece, flush axially facing pole faces formed on the end of one of said rings and on the corresponding end of said inner pole piece, an annulus of nonmagnetic wear material disposed between said one ring and said inner pole piece in front of said flanges and having an outer surface flush with said pole faces, a magnet having an annular magnetic core with concentric pole pieces, concentric cylindrical surfaces formed on the other of said rings and on the corresponding end portion of said inner pole piece and telescoping with said cylindrical pole pieces of said magnet, and a ring of nonmagnetic material connected at its inner periphery to said inner pole piece and having its outer peripheral portion lying against and connected to one of said flanges.

5. A separate pole piece unit for an annular magnet, said unit comprising a first annular pole piece having an axially facing pole face, a first ring of magnetic material concentric with said pole piece and having at one end a pole face flush with said first pole face, an annulus of nonmagnetic wear material disposed between said ring and said pole piece flush with said pole faces, a flange on the other end of said ring projecting radially toward said pole piece and providing a backing for said wear material, a second magnetic ring axially alined with first ring and having a radial flange abutting against and connected to the flange on said first ring whereby said two rings form a second annular pole piece, and a nonmagnetic element fastened to said first pole piece and having a part lying alongside and joined to one of said flanges thereby to rigidly connect but magnetically separate said two pole pieces, said pole pieces having concentric cylindrical surfaces adapted to oppose cylindrical surfaces on said magnet.

6. An annular pole piece unit comprising an annulus of magnetic material constituting a pole piece having an axially facing pole face and a cylindrical surface behind said pole face, two axially alined rings of magnetic material mounted concentric with said annulus and having flanges on the adjacent ends thereof projecting radially toward said annulus, said flanges abutting against each other and being connected to join said rings together and form a second pole piece, one of said rings having an axially facing pole face flush with said first pole face and the other of said rings having a cylindrical surface concentric with said first surface, and a nonmagnetic element connected to said annulus and to one of said flanges to rigidly join but magnetically separate said pole pieces.

7. An annular pole piece unit comprising an outer annular pole piece of magnetic material, an inner pole piece unit of magnetic material smaller in diameter than and concentric with said outer pole piece, said inner pole piece having first and second cylindrical portions offset axially and radially from each other and an intermediate portion extending radially between and joining the adjacent ends of the cylindrical portions, axially facing pole faces formed on the outer end of said first cylindrical portion and on the corresponding end of said outer pole piece, a ring of nonmagnetic wear material disposed between said first portion and said outer pole piece and having an axially facing surface flush with said pole faces, concentric cylindrical surfaces formed on said second portion and on the corresponding part of said outer pole piece, and a nonmagnetic ring having its outer periphery connected to said outer pole piece and its inner peripheral edge portion lying against and secured to said intermediate portion to rigidly join but magnetically separate said pole pieces.

8. A pole piece unit for a magnet having an annular core with concentric cylindrical pole pieces, said unit comprising a first annular pole piece of magnetic material having concentric but radially and axially offset cylindrical portions and an intermediate portion extending radially between and joining the adjacent ends of the cylindrical portions, a second pole piece of magnetic material concentric with and radially spaced from said first pole piece, a nonmagnetic element connected to said second pole piece and lying against and connected to said intermediate portion to rigidly join but magnetically separate said pole pieces, axially facing pole faces formed on the end of one of said cylindrical portions and on the corresponding end of said second pole piece, a ring of nonmagnetic wear material disposed between said one cylindrical portion and said second pole piece and having a surface flush with said pole faces, and cylindrical surfaces formed on the other parts of said cylindrical portions and on the corresponding part of said second pole piece and telescoping with said cylindrical pole pieces on the core of said magnet.

9. A pole piece unit comprising a supporting member disposed along a predetermined axis, inner and outer pole piece rings concentric with said axis and spaced apart radially, said inner ring comprising first and second cylindrical portions radially and axially offset from each other and an intermediate portion extending radially between and joining the adjacent ends of the cylindrical portions, a flange extending radially inwardly from the outer end of said second cylindrical portion and connected to said member to support said inner ring about said axis, a nonmagnetic element having a part joined to said outer ring and a part overlying and fastened to said intermediate portion to rigidly connect but magnetically separate said rings, concentric cylindrical surfaces formed on said second cylindrical portion and on the corresponding part of said outer ring and adapted to oppose and be disposed close to cylindrical surfaces on the core of an annular magnet, and axially facing pole faces formed on the outer end of said first cylindrical portion and on the corresponding end of said outer ring.

10. A pole piece unit having, in combination, a magnetic cylinder having a pole face at one end, an inturned flange integral with the other end, a second cylinder smaller in diameter than said first cylinder and having a pole face at one end substantially flush with said first pole face, a second flange integral with the other end of said second cylinder and turned inwardly therefrom, a nonmagnetic annulus spanning said cylinders and having inner and outer edge portions abutting against and secured to said first and second flanges, and an annulus of wear resistant friction material seated in the recess defined by said cylinders and said first flange.

11. A pole piece unit having, in combination, a magnetic cylinder having a pole face at one end, an inturned flange integral with the other end, a second cylinder smaller in diameter than said first cylinder and having a pole face at one end substantially flush with said first pole face, a second flange integral with the other end of said second cylinder and turned inwardly therefrom, a nonmagnetic annulus spanning said cylinders and having inner and outer edge portions abutting against and secured to said first and second flanges, an annulus of wear resistant friction material seated in the recess defined by said cylinders and said first flange, a third cylinder integral with the inner end of said second flange and projecting from said second flange in a direction opposite to said second cylinder, and a fourth cylinder rigid with said first cylinder and concentric with said third cylinder.

12. A pole piece unit for a magnet with an annular core, said unit having, in combination, outer and inner concentric rings of magnetic material radially spaced apart and constituting annular pole pieces, a nonmagnetic element rigidly connecting by magnetically separating said rings, pole faces formed on the outer ends of said rings, a supporting member disposed along the axis of said rings, a portion of said inner ring behind the corresponding pole face being cylindrical and then extending first inwardly toward said axis through an angle greater than a right angle and then reversely to form a second cylindrical portion spaced from the pole face and providing a cylindrical surface, said inner ring extending inwardly toward said axis beyond said second cylindrical portion to form a flange, means mounting said flange on said member to support the pole piece unit about said axis, and a second cylindrical surface formed on said outer ring, said two cylindrical surfaces being adapted to telescope with the core of said magnet.

References Cited in the file of this patent

UNITED STATES PATENTS 2,039,714     Fuller _____ May 5, 1936

FOREIGN PATENTS 194,274     Germany _____ Jan. 22, 1908